United States Patent Office 2,722,474
Patented Nov. 1, 1955

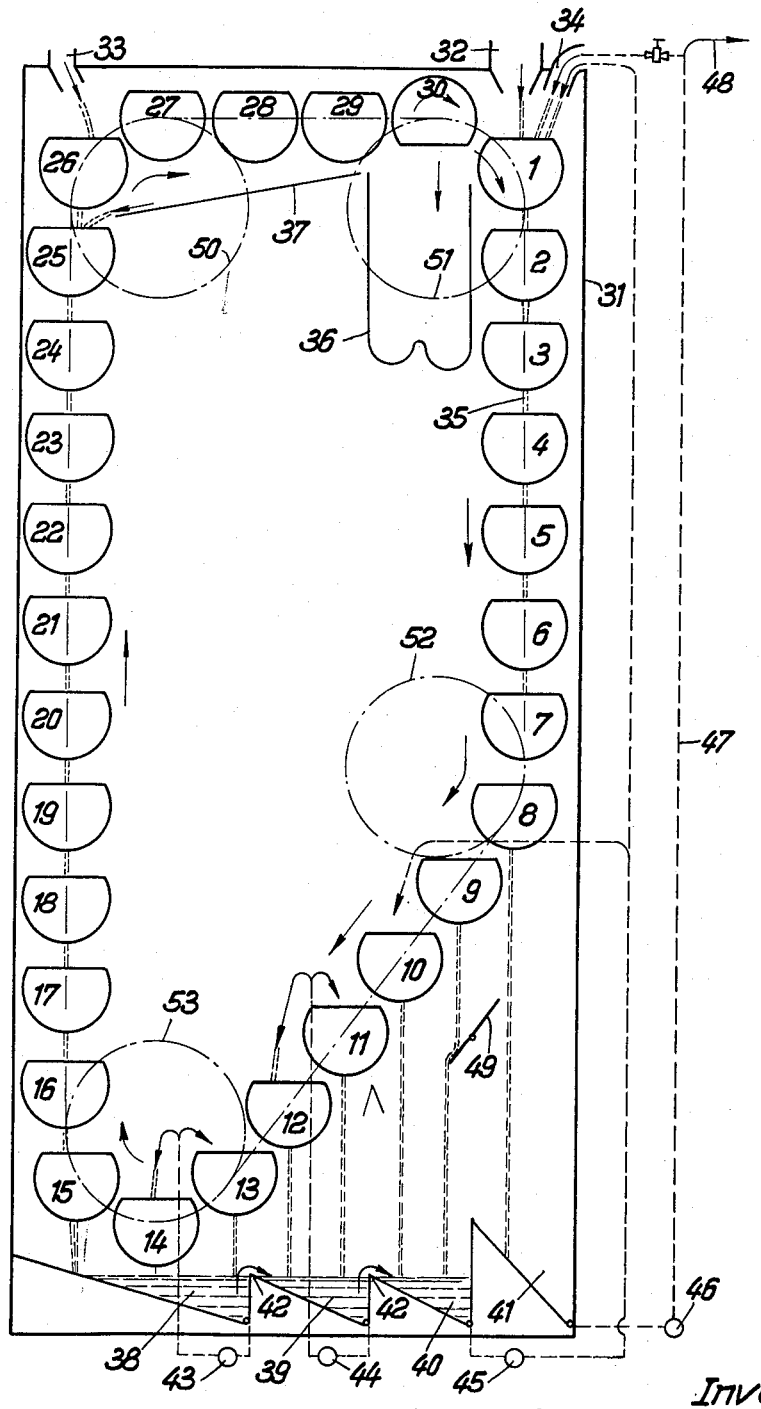

2,722,474

APPARATUS FOR THE CONTINUOUS EXTRACTION OF SOLID SUBSTANCES IN BASKET CONVEYOR EXTRACTORS

Karl Hanke, Bad Homburg, vor der Hohe, and Wilhelm Depmer, Hamburg, Germany, assignors to Metallgesellschaft Aktiengesellschaft, Frankfurt am Main, Germany, a corporation of Germany Application June 10, 1952, Serial No. 292,768

8 Claims. (Cl. 23—270)

This invention relates to an apparatus for the continuous extraction of solid substances with solvents in basket conveyor extractors.

In the hitherto known processes for the continuous extraction of solid substances with solvents in basket conveyor extractors with uniflow or counter-current extraction, the method is completed in the following separate stages:

1. Introduction of the material for extraction into a vessel of the system, while simultaneously sprinkling and moistening the material with solution or miscella which is already concentrated.
2. Uniflow extraction on the descending side of the system, a repeated auto-filtration of the miscella by the material for extraction itself taking place simultaneously along the entire path.
3. Unused transfer from the uniflow to the counter-current side in the lower part of the extractor.
4. Counter-current extraction.
5. Draining of adhering solvent.
6. Emptying of the extraction vessels.

For these known extraction processes, in which it is necessary to differentiate essentially between a descending uniflow section and an ascending counter-current section, two-wheel basket conveyors are employed. As such are understood those extractors in which the extraction vessels suspended in an endless chain are guided over a lower and an upper guide wheel, i. e. the vessels descend and ascend vertically in substantially the same number on both sides of the system.

These known extraction processes and the extractors employed for carrying these processes into effect have the disadvantage that only about 35 percent of the vessels of the installation are available for the most effective oil separation of the seed material in the counter-current side of the system. In addition, however, a further 20 percent of the extraction vessels of the installation are not in use, these being required for the filling, transferring, draining and emptying stages.

It is apparent from this that the efficiency of the known continuous extraction processes, which are carried out with the above-described vertical basket conveyor extractors with uniflow and counter-current extraction, is not entirely satisfactory.

In order to produce a counter-current extraction which shall be as complete as possible, extractors with horizontally disposed basket conveyors have already been constructed, but with such arrangements a series of other disadvantages had to be accepted. These consist more particularly in that each extraction stage or each vessel requires a pump if the drop in concentration between extract content in the material for extraction and in the solution is to be as high or substantially as high as that positively obtained on the ascending side without the provision of pumps by series-connection in the vertical basket conveyor. In practice, efforts have been made to solve this question by assembling a plurality of successive vessels to form groups of equal concentration and thus connecting 6–8 stages in series corresponding to the use of an equivalent number of pumps. From the technical aspect of the process, this arrangement has the disadvantage that each stage only permits an oil extraction up to the point of attaining the equilibrium curve between extract content in the material for extraction and the solution. This provides the result, inter alia, that the possibility of being able repeatedly to deliver miscellae of a definite concentration within one stage is of only very limited importance, since the balancing of the concentration, for example, in the extraction of oil seeds, is effected in a few minutes. As is known, the possibility of being able to allow any desired quantities of miscellae to circulate repeatedly is also limited by the fact that the material for extraction, correctly prepared in a given time and for a good extracting action and removal of benzine after the extraction, is found from experience to permeate only about the same quantities of solvent as corresponds to the weight of that part of the material being extracted which is disposed at a definite layer level in the corresponding part of the operation. In the basket conveyor extractor, this condition is fulfilled from the outset and positively without the provision of pumps. In addition to requiring the use of a large number of pumps, these extractors have the further disadvantage that the material being extracted is introduced into the extractor at the top and leaves it again at the bottom, so that the extractor with its high operational weight either has to be set up on a heavy supporting structure or has to be connected by means of a benzine-tight elevator or other vertical conveyor with the following waste-benzine distillation.

The present invention aims at obviating the aforementioned defects of the known extraction processes, and of the customary basket conveyor extractors for carrying such processes into effect which use uniflow and counter-current extraction and to provide a process for the continuous extraction of solid materials by solvents in basket conveyor extractors, which assures a considerably better efficiency than the previously known extraction processes of the type described.

For the solution of this problem, in accordance with the invention, the ascending side of the system is utilised entirely for the most efficient genuine counter-current extraction, that is to say, without the assistance of supplementary pumps, and all other operations such as draining the solvent upon completion of the extraction, emptying the vessels, and on occasion cleaning the screens, filling the vessels and impregnating the material being extracted, steeping periods with autofiltration of the final miscella, take place in the vertically guided vessels or the series of vessels, while the extension of the counter-current extraction takes place in the horizontally guided or the series of vessels downwardly inclined in the direction of the movement of the vessels by repeated direct removal and delivery of solvent or miscella to individual vessels.

To this end, the invention provides that the descending section of the extraction vessels consists of a part with vessels disposed vertically one below the other and a part with laterally staggered vessels and that the ascending section only contains vessels disposed vertically one above the other and, in the draining stage, the vessels are preferably arranged horizontally or substantially horizontally, or even running at an inclination upwardly or downwardly.

A further feature of the invention consists in that the endless chain of the extraction vessels runs over more than two deflecting devices.

In addition, a collecting trough is provided below those vessels of the system which are preferably guided horizontally, said trough collecting the draining miscella or solution and being connected with the folowing vessels.

This horizontal part of the system can also be used for the counter-current extraction, for example, in such manner that the fresh solvent is delivered at this point and is collected jointly with the draining solvent in the trough disposed therebeneath and is delivered again, for example by means of pumps, to the same part or to the uppermost vessel of the ascending series of vessels.

Furthermore, an intermediate space which corresponds, for example, to the spacing of one vessel, may be provided between the station at which the extraction residues are removed from the vessels by rotation of the latter about their own axes, and the station at which the introduction of fresh extraction material is effected below the filling arrangement, said intermediate space being provided so that in this section, those screens at the bottoms of the vessels from which the miscella is withdrawn are additionally freed from adhering portions of the extraction material by washing with miscella or pure solvent or by a mechanical beater mechanism, preferably with repeated rotation about the axis of the vessel. Underneath this section, there is expediently also provided a collecting container, for example, of funnel shape, in order that the accumulating quantity of washing liquid plus impurities are again introduced into the extraction process in other treating sections of the extractor, for example, underneath the filling arrangement.

Furthermore, the vessels in the section of the system extending with a downward inclination can be arranged in stepped formation with the bottom discharge opening disposed outside the range of the vessel disposed at a lower level, and a suitable number of chambers, for example from one to three, are provided beneath the vessels for collecting the discharging solution or miscella, said chambers being connected in series by overflows in the direction of the increasing concentration of the solution.

The invention is further characterised by pump installations and miscella conduits for the selective circulation of the miscella in the stepped counter-current section of the system.

For the purpose of further explaining the invention, an arrangement for carrying the same into effect is illustrated diagrammatically in the accompanying drawing as a section through an extractor with an endless chain of extraction vessels.

31 represents the housing of an extractor, which is provided with a supply device 32 for the material from which oil is to be extracted, with a supply conduit 33 for fresh solvent and with a supply conduit 34 through which miscella of various concentrations can be selectively supplied.

Arranged in the housing 31 is an endless chain of extraction vessels 1 to 30, which continuously turns in the direction of the arrows indicated, so that the vessels move in a downward direction on the right-hand side and in an upward direction on the opposite side.

The extraction vessels 1 to 30 are of the type and construction which is known per se: they are formed at the bottom with a discharge opening through which the solvent and the miscella, respectively, can drain, as indicated, for example, at 35 in the descending section of the system.

In contrast to the hitherto known basket conveyor extractors with continuous extraction on the uniflow and counter-current principle, all the vessels disposed in the ascending section are utilised, according to the invention, for counter-current extraction and, in addition, a further part of the vessels of the descending section is laterally deflected, and led at a downward inclination (in the embodiment illustrated, this takes place substantially in the lower half), whereby the miscella or solution is drained from each of these vessels without passing to the next vessel, so that this miscella or solution can be further concentrated in counter-current for the progress of the extraction by repeated supply.

As will be apparent from the drawing, this lateral deflection of the extraction vessels in the descending section of the system, the vertical portion of which extends from the vessel 1 to the vessel 8, occurs directly after the vessel 8, the arrangement in this section of the system which then runs in a downwardly inclined direction and which extends from vessel 9 to vessel 14, being such that the vessels are disposed in stepped formation one above the other and the discharge openings of the vessels are disposed outside the range of the vessel which at the time is at a lower level so that the discharging miscella can pass freely in a downward direction.

The rising section of the system comprises, for example, vessel 15 to vessel 26, and then passes into a draining section which extends, for example, from vessel 27 to vessel 29, and in which the vessels travel horizontally or substantially horizontally.

Finally, the vessels are emptied in known manner into an inner silo 36, such as indicated by the vessel 30 and also the arrows.

Consequently, in accordance with the invention, the basket conveyor extraction system can be selectively subdivided into:

1. A uniflow side commencing with the introduction of material and solvent or miscella with subsequent percolation of the solution through the material being extracted so as to soak the latter, and also the repeated auto-filtration of the final solution by the extraction material itself.
2. A section of the system which extends at a downward inclination in which the solvent or miscella can circulate at will.
3. A vertically ascending basket conveyor section for pure counter-current extraction.
4. A horizontal or, for example, a downwardly inclined section of the system for the draining of the solvent, which also facilitates a free discharge of the solution and miscella.
5. An emptying station to which can be connected one or more cleansing stations for the screens of the vessels.

In order to carry this into effect, in accordance with the invention and in contrast to the hitherto known processes and the known and customary extractors for carrying them into effect, in which extractors the endless chain runs over two driving and guiding wheels, the endless chain is guided over, for example four deflecting points or driving wheels 50, 51, 52, 53, the driving wheel and the upper deflecting point 50, 51 being so arranged and constructed that, for example, the vessels 27—29 are moved horizontally or substantially horizontally, while at the bottom deflecting points 52, 53, the deflection is so arranged that a substantial part of the uniflow section, as previously described and illustrated, is directed at a downward inclination with the vessels spaced in stepped formation.

Whereas in the hitherto known extraction process of the same type, the same number of vessels travel downwardly and upwardly in the descending section and in the ascending section, respectively, the present invention provides a fundamental change in this respect in that twice as many vessels are travelling upwardly in the counter-current section of the system as compared to the vessels moving downwardly in the uniflow section of the system, to serve in the latter section for the auto-filtration of the miscella and softening of the extraction material, and the vessels deflected from this uniflow branch are now made available for the extraction by the stepped countercurrent principle.

This is more fully explained, for example, in the following:

Provided in the lower part of the housing of the extractor are chambers 38 to 41: the chambers 38 to 40 collect the draining solution of the vessels descending in the downwardly inclined section of the system. These vessels are interconnected, for example, by overflows 42, while the chamber 41 collects the miscella draining from the downwardly travelling vessels in the uniflow section of the system. 43 to 45 indicate pumps which pump the miscella from the chambers to which they are connected into the descending vessels 9 to 14 as indicated in broken lines: it is also possible to install one or more additional pumps and, in accordance with the invention, to provide a further subdivision of the bottom of the extractor into a relatively large number of chambers in order in this manner to include in the apparatus an additional extraction stage or even several stages, since it has been found that the specific output of the extractor can be still further increased in this way or a higher final concentration of the miscella can be produced: on the other hand the pump 46 pumps the miscella from the chamber 41 through a pipe 47 shown in broken lines selectively into a distillation device which is not shown and is only indicated by the arrow 48 or even partly through the supply line 34 into the uniflow branch again. It is also provided that the pump 45 should selectively introduce miscella from the chamber 40 into the vessels 9—10 extending in the downwardly inclined direction or, conveyed upwardly, into the uniflow section again at 34.

49 represents a regulating means by which the miscella flowing from the vessel 9 can also be selectively led into the chamber 41.

Arranged beneath the horizontally extending vessels 27—29 of the draining section of the system, is a trough 37 which leads the miscella flowing from the vessel in the draining section into the counter-current section of the system again, as this occurs with the vessel 25.

The operation of the novel process and of the extractor hereinbefore explained by way of example for carrying such process into effect, is as follows:

The oil seed is introduced into the vessel 1 which is descending and which is supplied through the pipe 34 with miscella which is pumped at will from the chambers 40 and/or 41. The excess miscella running from the bottom travels into the vessels of the uniflow section which are at a lower level, namely the vessels 2 to 8, until finally the miscella drains from the vessel 8 into the chamber 41, corresponding to the position of the regulator 49, in a partially or completely purified form, as a result of auto-filtration and the extraction material is softened in this section. The vessels 9 to 14 leading at a downward inclination after the vessel 8 receive miscella pumped from the chambers 38 to 40 which are disposed beneath them and, as indicated in the drawing, always two vessels, i. e. the vessels 9 and 10 are supplied from the chamber 40, the vessels 11 and 12 from the vessel 39 and the vessels 13 and 14 from the chamber 38. The extraction material in the vessels 9 to 14 is thus extracted intermittently on the counter-current principle. This counter-current extraction in the downwardly inclined section of the system is added to the counter-current extraction in the section of the system of the vessels 15 to 26, which travel opposite to the fresh solvent introduced at 33 and supplied to the vessel 26 and to the downwardly flowing miscella. The solvent draining from the vessels 27 to 29 and enriched with oil to a comparatively small degree is supplied by the trough 37 to the vessel 25.

In the apparatus described, therefore, altogether eighteen vessels of the total number of 30 extraction vessels, that is to say, substantially 60% of the extractor volume of the installation, are available for the counter-current extraction.

As compared with the known process and the customary extractors normally employed for carrying it into effect and having a normal utilisation of the counter-current of about 35%, there is produced an increase in output of more than 50%, based on the specific capacity of the vessel volume of the installation.

In addition, the height of the proposed extractor is capable of being reduced by several vessel spacings, because the draining vessel section has been arranged in the horizontal or downwardly inclined plane. Moreover, as a result of the downwardly inclined guiding of the chain of vessels in the draining zone, the filling arrangement can be so arranged that the point of connection thereof to the conveyor element is at substantially the same level as the highest point of the extractor. The reduction of the structural height of the extractor, including the structural height of the filling arrangement, is naturally favourable to the structural height of the extraction building, whereby the cost of construction of the latter can be substantially lowered.

As a result of the draining stage arranged horizontally or at an inclination, the solvent draining from all vessels of this stage is immediately completely returned to the extraction section and is not always conveyed through that content of the following vessel which is disposed in the middle, as is the case in the hitherto known constructions of the basket conveyor extractors. By this means, the content of solvent in the steeped extraction material is further lowered as compared with the method of operation previously in use.

A further advantage of the arrangement of the present invention consists in that the fresh solvent can be completely and continuously supplied to the upper surface of the uppermost vessel without any dripping alongside. In this way, a better utilisation of the solvent supplied is obtained.

The extension of the counter-current extraction in accordance with the invention can also be used in the two-wheel extractor in which the vessels in the bottom transfer zone are supplied, for example, by pumps, with the miscella collecting beneath the ascending section, this miscella being collected in a separate bottom chamber after passing through these vessels and is only then delivered at the filling arrangement. By increasing the deflecting wheels, the draining period can also be so arranged that a free discharge of the solvent is possible and in addition the number of stages in the bottom transfer zone of the vessels is increased.

What we claim is:

1. An apparatus for the continuous extraction of solid substances comprising an endless chain of vessels each of which permits a vertical flow of liquid therethrough, means for continuously circulating said vessels in a vertical plane, means for introducing solvent into the upper-most of the ascending vessels, means for introducing solid substances and miscella in the uppermost of the descending vessels, guide means for said chain of vessels so that a part of the descending vessels are disposed vertically one below the other and others are disposed in laterally staggered relations so that liquid will not drain from an upper into a lower vessel, all of the ascending vessels being disposed vertically one above the other and constituting vessels draining from an upper into a lower vessel in greater numbers than similar descending vessels, a draining portion in said chain of vessels arranged in laterally displaced relationship extending between the ascending and descending vessels at the upper portion of said chain of vessels, and means for conducting the drainage from said draining portion of said chain of vessels into said upwardly ascending vessels.

2. An apparatus as in claim 1, further comprising means for collecting miscella drained from said vessels in laterally staggered relations, and means for recirculating said miscella into said laterally staggered vessels.

3. An apparatus as in claim 1, said conducting means further comprising a collecting trough beneath said draining portion of said chain of vessels for directing the drainage into said upwardly ascending vessels.

4. An apparatus as in claim 1, said collecting means further comprising collecting chambers beneath said chain of vessels for collecting the drainage therefrom, said chambers being separated by walls arranged so that the overflow of drainage from one chamber to the other takes place in the direction of increased drainage concentration.

5. An apparatus as in claim 4, further comprising conduits providing communication between said chambers and respective vessels in said laterally staggered descending vessels, and pumps in said conduits for recirculating the drainage to said latter vessels.

6. An apparatus as in claim 5, further comprising means for inverting each vessel as it leaves said drainage portion of said chain of vessels to empty said vessel, means for cleaning said vessel, and means for righting said vessel.

7. An apparatus as in claim 6, said cleaning means further comprising means for washing the inverted vessel with solvent.

8. An apparatus as in claim 6, said cleaning means further comprising means for mechanically beating the inverted vessel.

References Cited in the file of this patent

UNITED STATES PATENTS

| 1,064,194 | Carroll | June 10, 1913 |
| 2,225,799 | Robinson | Dec. 24, 1940 |
| 2,273,557 | Bonotto | Feb. 17, 1942 |

FOREIGN PATENTS

| 507,465 | Great Britain | June 15, 1939 |
| 589,233 | Germany | Dec. 4, 1933 |
| 74,042 | Switzerland | Jan. 2, 1917 |